United States Patent [19]

Whiteley

[11] 4,286,975
[45] Sep. 1, 1981

[54] CHIMNEY HEAT EXCHANGER

[76] Inventor: Isaac C. Whiteley, 422 NE. 165th #24, Portland, Oreg. 97230

[21] Appl. No.: 81,180

[22] Filed: Oct. 2, 1979

[51] Int. Cl.³ ............... B01D 46/32; E04F 17/02; F23J 15/00; F28D 7/14
[52] U.S. Cl. .................. 55/269; 55/309; 55/390; 55/470; 55/474; 55/515; 55/523; 98/58; 110/216; 165/156; 165/184; 165/DIG. 2
[58] Field of Search ............ 55/269, 309, 385 A, 55/390, 470, 474, 515, 523, DIG. 20; 98/58; 110/119, 204, 205, 216, 217; 165/156, 184, DIG. 2; 261/17, DIG. 9

[56] References Cited

U.S. PATENT DOCUMENTS

| | | | |
|---|---|---|---|
| 1,960,510 | 5/1934 | Ridgway | 165/DIG. 2 |
| 2,619,022 | 11/1952 | Hergenrother | 165/184 |
| 2,663,549 | 12/1953 | Otten | 165/150 |
| 2,826,264 | 3/1958 | McIlvaine | 55/309 |
| 3,368,505 | 2/1968 | Harrison | 110/119 |
| 3,403,499 | 10/1968 | Zador | 55/282 |
| 4,090,558 | 5/1978 | Akama | 165/156 |
| 4,124,021 | 11/1978 | Molitor | 55/269 |

Primary Examiner—David L. Lacey
Attorney, Agent, or Firm—Robert H. Epstein

[57] ABSTRACT

A heat exchanger for installation on the top of a chimney of a building includes a housing having a lower end receiving the top of the chimney and an upper end with openings permitting the escape of effluent from the chimney and a heat exchanger assembly disposed in the housing including a central chamber and a spirally arranged duct network defining an effluent spiral path between the top of the chimney and the central chamber and a fresh air spiral path between an inlet disposed at the lower end of the housing and the central chamber, the effluent and fresh air spiral paths being in heat exchange relationship such that air passing through the fresh air spiral path is heated by hot effluent gases passing upward through the chimney and the effluent spiral path for use in heating the building. A pollution trap can be disposed in the central chamber of the heat exchanger assembly for removing pollutants from the effluent, the pollution trap including a rotating cage carrying pumice stones for absorbing pollutants from the effluent with the surface of the pumice gradually ground off to reveal fresh stone as the cage rotates.

10 Claims, 3 Drawing Figures

CHIMNEY HEAT EXCHANGER

BACKGROUND OF THE INVENTION

1. Field of the Invention

The present invention pertains to the extraction of heat from hot chimney effluent and, more particularly, to a heat exchanger and pollution trap for installation on the top of a chimney.

2. Discussion of the Prior Art

Many attempts have been made in the past to extract heat from hot effluent flue gases passing up the chimney or smoke stack of a building, such heat being desirably returned to the building for heating thereof. Such prior art attempts have not been universally accepted, primarily due to difficulties and expense of installation in that most prior art heat exchanger devices have been mounted within the chimney or smoke stack requiring alteration thereof for installation. There are many pitfalls in the design of an efficient, and yet, safe heat exchanger for flue gases including the construction of an efficient heat exchanger assembly while assuring no mixture of hot effluent with air to be heated and returned to the building. U.S. Pat. Nos. 2,663,549 to Otten and 3,960,992 to Cyrenne are exemplary of prior art attempts to utilize heat exchangers for extracting heat from flue gases.

Along with the extraction of heat from effluent flue gases, it is also desirable to remove pollutants from such gases to maintain the atmosphere as clean as possible. While the prior art, as represented by U.S. Pat. Nos. 1,085,712 to Vadner, 3,403,499 to Sador and 3,918,915 to Holler, Jr., is cognizant of the use of a mass of solid pellets or particles to remove pollutants from flue gases, there has been no device produced for removing pollutants from flue gases while providing efficient heat transfer to fresh air for supply to a building.

SUMMARY OF THE INVENTION

Accordingly, it is a primary object of the present invention to provide a heat exchanger that can be installed on the top of a chimney or smokestack for extracting heat from hot effluent gases and returning the heat to the building.

Another object of the present invention is to utilize effluent and fresh air spiral paths in heat exchange relation in a housing at the top of a chimney to transfer heat from the effluent to the fresh air for return to the building.

Another object of the present invention is to utilize a rotating stone-type filter in a heat exchanger to be mounted at the top of a chimney for removing pollutants from effluent, the stones absorbing pollutants and having the surface thereof gradually ground off to reveal fresh stone.

Some of the advantages of the present invention over the prior art are that the heat exchanger of the present invention can be simply and inexpensively installed at the top of a chimney without requiring modification of the chimney, the housing of the heat exchanger is designed to prevent down drafts and to assure that exhausted effluent is not returned in the fresh air intake, and by supplying the heated fresh air to a building utilizing a fireplace, combustion air required for the fire can be replaced by the heated air rather than by cold outside air.

The present invention is generally characterized in a heat exchanger for installation on the top of a chimney of a building including a housing having a lower end for receiving the top of a chimney, a plenum and an upper end with openings therein, and a heat exchanger assembly disposed in the housing including a central chamber and a duct defining an effluent spiral path between the top of the chimney and the central chamber and a fresh air spiral path between an inlet disposed at the lower end of the housing and the central chamber, the effluent and fresh air spiral paths being in heat exchange relationship whereby the air passing through the fresh air spiral path is heated by the effluent passing through the effluent spiral path and can be used to heat the building.

Other objects and advantages of the present invention will become apparent from the following description of the preferred embodiment taken in conjunction with the accompanying drawings.

DESCRIPTION OF THE PREFERRED EMBODIMENT

Figure 1:
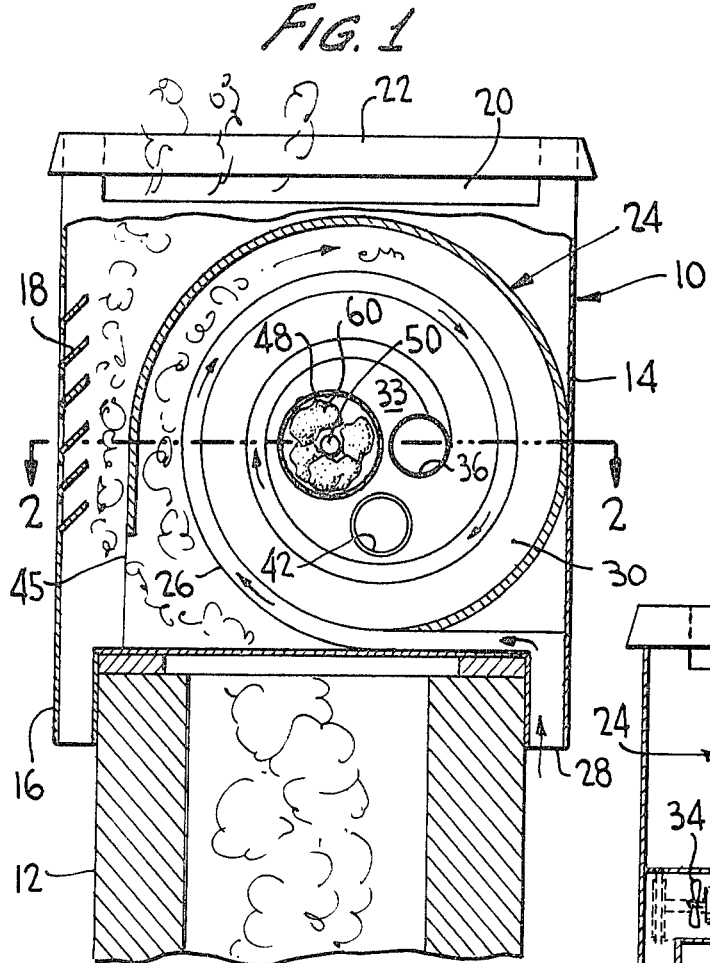
FIG. 1 is a side view in section of a chimney heat exchanger according to the present invention.
Figure 3:
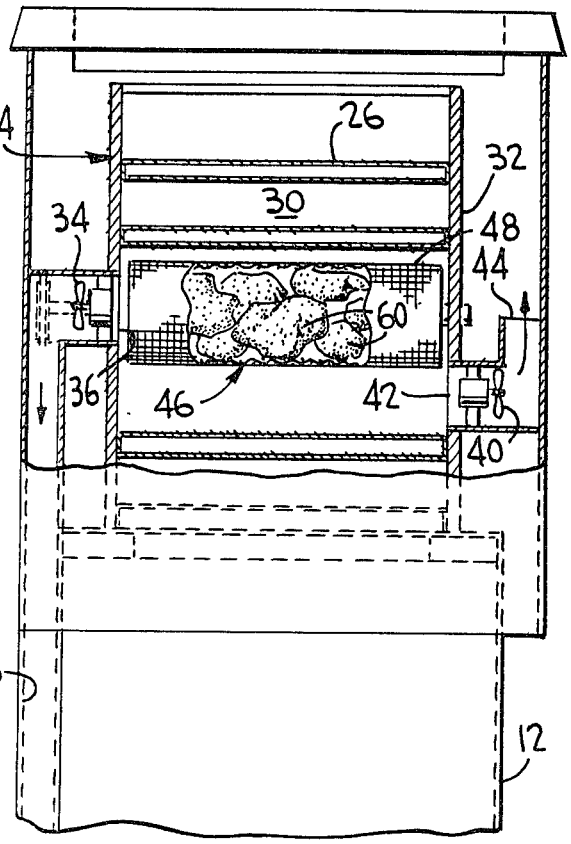
FIG. 3 is a section taken along line 3—3 of FIG. 2.
Figure 2:
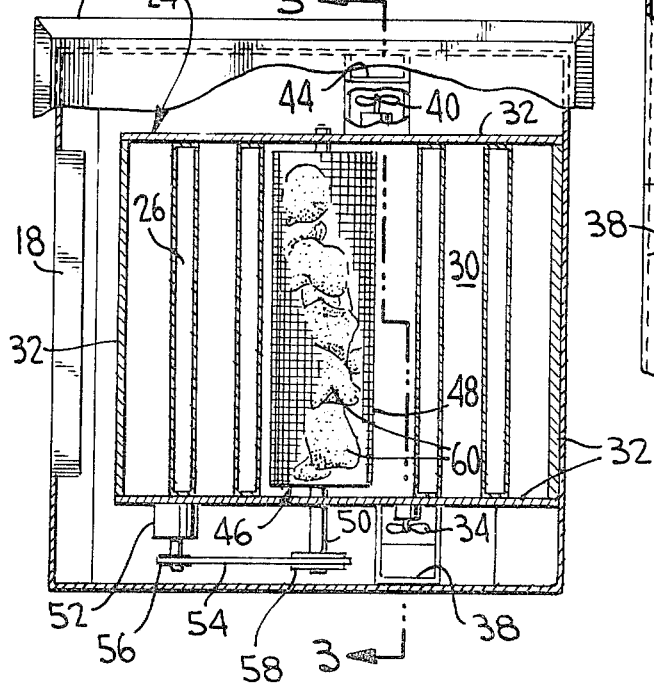
FIG. 2 is a section taken along line 2—2 of FIG. 1.

A heat exchanger 10 in accordance with the present invention is shown in FIG. 1 installed on the top of a chimney or smokestack 12 of a building, the heat exchanger including a housing 14 having a rectangular configuration in cross section with a lower end 16 for receiving the top of the chimney 12. Louvers 18 are disposed in a side wall of the housing and directed toward the upper end of the housing to prevent downdrafts, and the upper end of the housing has openings 20 along each side wall with the top of the housing closed by a cover 22.

Within the housing 14 is a spiral heat exchanger assembly 24 including a fresh air duct 26 having a rectangular configuration in cross section with an inlet 28 disposed at the lower end 16 of the housing in order to draw in fresh air uncontaminated by effluent from the chimney. The duct 26 is arranged in a spaced spiral or helical configuration to define a spiral space or path 30 for passage of effluent from the chimney 12, the effluent path 30 being further defined by side walls 32 of the heat exchanger assembly such that both the fresh air in duct 26 and the effluent in path 30 flow helically toward a central chamber 33 of the heat exchanger assembly 24. The fresh air is drawn to the center of the heat exchanger assembly 24 by a fan 34 driven by an electric motor, and the fresh air exits the heat exchanger assembly via a port 36 and is forced into a insulated heating duct 38 extending along the chimney for supply to the building. The effluent from the chimney is drawn to the central chamber of the heat exchanger assembly 24 by a fan 40 driven by an electric motor, the fan 40 being mounted on an opposite side of the heat exchanger assembly from fan 34 and receiving air from the heat exchanger assembly via a port 42 for supply, via an outlet 44, to a plenum surrounding the heat exchanger assembly within the housing for exhausting to the atmosphere via openings 20. Thus, it will be appreciated that effluent from the chimney exits at the top thereof and travels through the spiral path 30 due to the draft from fan 40 while fresh outside air is drawn into inlet 28 and passes through duct 26 such that the effluent and fresh air are in heat transfer relation via the walls of duct 26.

The housing and the heat exchanger assembly are preferably made of thermally conductive, fire resistant material, such as sheet metal; and, the outer wall of the heat exchanger assembly 24 has an opening 45 therein adjacent the top of the chimney to permit excess effluent to escape to the atmosphere via the plenum and openings 20 while bypassing the heat exchanger assembly.

A pollution trap 46 is mounted in the central chamber 33 of the heat exchanger assembly and includes a mesh or perforated cage 48 mounted for rotation in chamber 33 on a shaft 50 supported on side walls 32, the shaft 50 being driven by an electric motor 52 via a belt 54 and pulleys 56 and 58. The cage 48 is filled with pumice stones 60 such that the stones will tumble as the cage is slowly rotated by the motor 52.

In use, the heat exchanger 10 can be simply installed on the top of chimney 12 with the top of the chimney received in the lower end 16 of the housing, the housing being held in place by suitable screws, not shown. The insulated heating duct 38 extends along the chimney 12 to a desired location in a space to be heated within the building, it being noted that air supplied to the building via the heating duct 38 will replace combustion air utilized in a fireplace or furnace thereby overcoming the negative pressure normally created by combustion and exhaust of effluent gases up the chimney. With the heat exchanger 10 in place, whenever it is desired to utilize a heating device, such as a fireplace, a switch (not shown) is operated to energize the electric motors driving the fresh air and effluent fans 34 and 40 and the electric motor 52 rotating the cage 48 if the pollution trap 46 is utilized. With the fans 34 and 40 operating, hot flue gases or effluent will rise up the chimney and be drawn through the spiral path 30 to the central chamber 33 of the heat exchanger assembly and simultaneously fresh air will be drawn into inlet 28 and through spiral duct 26 to port 36 adjacent the central chamber 33 such that the heat exchange relationship between the spiral paths 26 and 30 formed by the duct network will transfer heat from the effluent to the fresh air, the heated fresh air being supplied to the building via duct 38. The louvers 18 prevent any downdraft of effluent as it exits the chimney and the opening 45 in the outer wall of the heat exchanger assembly 24 permits excess effluent to pass therethrough and into the plenum for discharge through the openings 20 bypassing the heat exchanger assembly. The positioning of the fresh air inlet 28 at the lower end of the housing 14 assures no contamination of the fresh air to be heated by effluent exiting through the openings 20 in the upper end of the housing 14.

When it is desired to utilize the pollution trap 46 of the present invention, the motor 52 will be operated to slowly rotate the cage 48 and the hot flue gases or effluent will pass through the cage with pollutants therein absorbed in the pumice 60. Slow rotation of the cage 48 will case the pumice to tumble within the cage such that the surface of the pumice which has absorbed the pollutants will be gradually ground off to reveal fresh stone for more efficient absorption of pollutants. When the pumice has been ground to an inefficient size, the pumice stones can be simply replaced in the cage.

Inasmuch as the present invention is subject to many variations, modifications and changes in detail, it is intended that all subject matter discussed above or shown in the accompanying drawings be interpreted as illustrative and not in a limited sense.

What is claimed is:

1. A heat exchanger for installation on the top of a chimney of a building comprising
   housing means having a lower end for receiving the top of a chimney having an effluent inlet therein for receiving effluent from the chimney and a fresh air inlet therein for receiving fresh air, a plenum and an upper end with openings therein; and
   a heat exchanger assembly disposed in said housing means including a central chamber, duct means defining an effluent spiral path between said effluent inlet in said lower end of said housing means and said central chamber for carrying effluent from the top of the chimney to said central chamber and a fresh air spiral path between said fresh air inlet and said central chamber, effluent outlet means communicating with said effluent spiral path at said central chamber and with said plenum, and fresh air outlet means communicating with said fresh air spiral path at said central chamber, said effluent and fresh air spiral paths being in heat exchange relationship whereby the air passing through said fresh air spiral path is heated by the effluent passing through said effluent spiral path and can be used to heat the building.

2. A heat exchanger as recited in claim 1 wherein said heat exchanger assembly includes fresh air fan means disposed in said fresh air outlet means for drawing air from said fresh air inlet through said fresh air spiral path to said central chamber and forcing the air through said fresh air outlet means.

3. A heat exchanger as recited in claim 2 wherein said heat exchanger assembly includes effluent fan means disposed in said effluent outlet means for drawing the effluent from the top of the chimney through said effluent spiral path to said central chamber and suppling the effluent to said plenum for exit via said openings in said housing means.

4. A heat exchanger as recited in claim 3 wherein said fresh air fan means and said effluent fan means are disposed on opposite sides of said heat exchanger assembly.

5. A heat exchanger as recited in claim 2 wherein said housing means has a side wall with louvers therein directed toward said upper end of said housing means to prevent down drafts.

6. A heat exchanger as recited in claim 5 wherein said heat exchanger assembly includes an outer wall having an opening therein providing communication between said effluent spiral path and said plenum permitting excess effluent to be supplied to said plenum bypassing said heat exchanger assembly.

7. A heat exchanger as recited in claim 6 wherein said heat exchanger assembly includes a heating duct communicating with said fresh air outlet means for extending along the chimney.

8. A heat exchanger as recited in claim 2 and further comprising pollution trap means disposed in said central chamber of said heat exchanger assembly.

9. A heat exchanger as recited in claim 8 wherein said pollution trap means includes a cage rotatably mounted in said central chamber of said heat exchanger assembly and absorbent stones carried within said cage for absorbing pollutants from the effluent, the surface of said stones being gradually grounded off to reveal fresh stone as said cage rotates.

10. A heat exchanger as recited in claim 9 wherein said stones are pumice.

* * * * *